Jan. 18, 1949.   W. W. HALLINAN   2,459,377
VARIABLE SPEED PULLEY
Filed Feb. 8, 1946
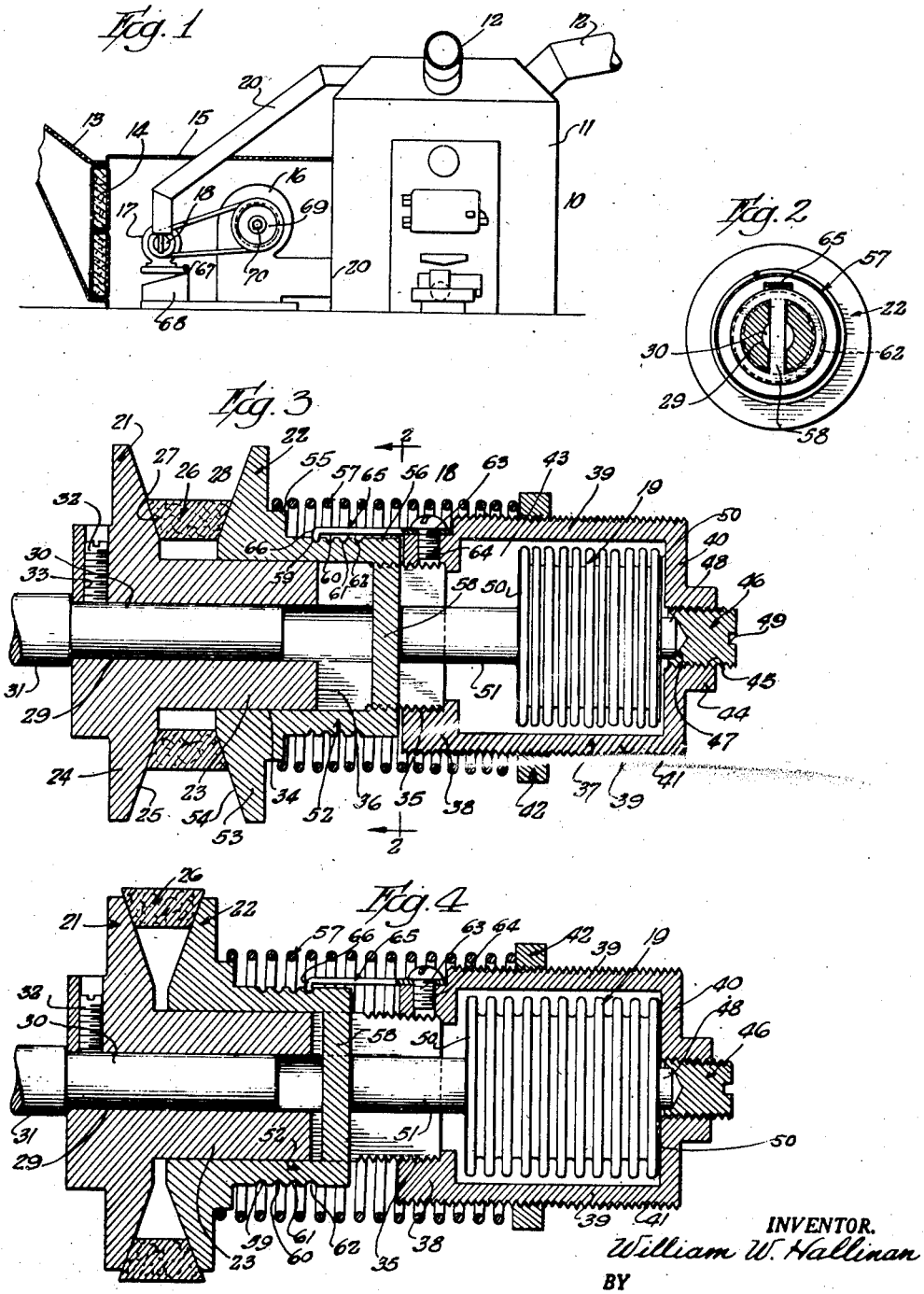
INVENTOR.
William W. Hallinan
BY
Robert H. Wendt
Atty.

Patented Jan. 18, 1949

2,459,377

UNITED STATES PATENT OFFICE 2,459,377

VARIABLE-SPEED PULLEY

William W. Hallinan, Racine, Wis.

Application February 8, 1946, Serial No. 646,267

2 Claims. (Cl. 74—230.17)

The present invention relates to variable speed pulleys and is particularly concerned with improvements in variable speed pulleys of the type covered by my prior patents, and particularly Patent No. 2,275,429 issued March 10, 1942 on Variable speed pulley.

The variable speed pulleys of my prior patent are distinguished from my present invention by the fact that the pulleys of my patent are adapted to vary the speed of drive of a fan or other driven device uniformly from a low speed to a high speed or vice versa by infinitely small changes.

One of the objects of the present invention is the provision of an improved variable speed pulley which is adapted to vary the speed of drive by definitely predetermined increments.

Another object of the invention is the provision of a variable speed pulley of the class described, the diameter of which definitely conforms to one of a plurality of different positions so that the blower may be driven at any one of a plurality of predetermined speeds.

Another object of the invention is the provision of an improved pulley of the class described which is provided with resilient means for holding the pulley sections in the position in which they happen to be, but which resilient means are of less strength than the axial force imposed on the pulley sections by the belt when arranged in the usual way, so that if the thermostat contracts, the belt is adapted to wedge the sections apart.

Another object of the invention is the provision of an improved pulley of the class described, in which the belt is resiliently opposed by a loading spring so that the pulley may be adjusted to be actuated at predetermined temperatures.

Other objects and advantages of the invention will be apparent from the following description and the accompanying drawings in which similar characters represent similar parts throughout the several views:

Referring to the single sheet of drawings accompanying the specification,

Fig. 1 is a vertical elevational view in partial section showing diagrammatically a heat installation embodying the invention;

Fig. 2 is a sectional view taken on the plane of the line 2—2 of Fig. 3 looking in the direction of the arrows;

Fig. 3 is a sectional view taken on a plane passing through the axis of the pulley showing the details of the parts in section with the pulley in its expanded position, the diameter of the pulley being at a minimum and the thermostat being contracted; and Fig. 4 is a view similar to Fig. 3 in which the pulley is almost at its maximum diameter position and the thermostat is almost fully expanded.

The present pulley, which is selected for illustration of the invention, is one which increases its diameter with an increase of temperature and which thus increases the speed of drive of the blower with an increase of temperature, however, the invention may be employed in devices which increase their diameter with a decrease in temperature of the thermostat.

Referring to Fig. 1, 10 indicates a hot air furnace, the furnace bonnet being indicated at 11 and provided with a plurality of hot air ducts 12. The bonnet communicates with a cold air return conduit 13 through the filter 14 and an auxiliary housing 15, which is adapted to house the centrifugal blower 16, a drive motor 17, and the present variable diameter pulley 18.

The present device is preferably actuated responsive to heat, hot air being conducted to the vicinity of the thermostat 19 by a pipe 20, which is connected to the upper part of the furnace bonnet 11, and which extends into the housing 15 and terminates adjacent the thermostat 19. Thus the thermostatic pulley is controlled by the temperature of the air being delivered by the furnace bonnet 11, although it is disposed in the cold air intake, the air passing into the housings of the centrifugal fan at the axis of the fan shaft and out at the hot air pipe 20, which communicates with the lower part of the furnace casing 10.

Referring to Fig. 3, the variable speed pulley is indicated in its entirety by the numeral 18. It comprises a pair of pulley sections 21, 22, which are telescopically mounted upon each other. The pulley section 21 comprises a metal member provided with a cylindrical hub 23 and a pulley disk 24, which has a frusto-conical surface 25 for engaging a V-belt 26, such as a belt made of rubber reinforced by fabric.

While the V-belt is usually so called, it is actually trapezoidal in section, as shown, having the two wedging surfaces 27, 28 for engaging the pulley sections.

The hub 23 has a cylindrical bore 29 for engaging the reduced cylindrical end 30 of the motor shaft 31. It may be secured on the shaft by a set screw 32 threaded into the threaded bore 33 in an outer extension of the hub 23. At its right end the hub 23 is provided with a cylindrical surface 34, which is threaded, as indicated at 35, at the extreme end and provided with an axial slot 36, as well as the bore 29.

The threaded portion 35 is used for supporting a housing or frame 37, which carries the thermostat 19 and permits adjustment of the thermostat position longitudinally on the device with respect to the two pulley sections. The frame 37 preferably includes an annular supporting body 38 and a pair of diametrically opposed partially cylindrical portions 39, which are joined by a transverse circular yoke 40.

The cylindrical portions 39 are also preferably threaded at 41 to receive a spring seating ring 42, which is threaded on the frame 37. The length of the legs 39 is sufficient to provide sufficient space 43 inside the frame for the thermostat 19 to achieve its maximum expansion.

At the right end of the device (Fig. 3) the disk or yoke 40 has a centrally located lug 44, which is provided with an axially threaded bore 45 for receiving a threaded member 46 by means of which the thermostat 19 may be adjusted. The threaded member 46 has a cylindrical bore 47 for receiving a supporting lug 48 carried by the thermostat 19, and the threaded member 46 preferably has a slot 49 for receiving a screwdriver.

The thermostat 19 preferably consists of a metal member of the bellows type, closed by a pair of end members 50, 50, one of which is supported by the threaded member 46. The other end plate 50 may carry a cylindrical stud 51, which is slidably received in the bore 29 of the pulley section 21.

The thermostat may be filled with various well known refrigerants; but, when used for air conditioning units, I prefer to use trichloromonofluormethane (F-11). The refrigerant selected depends upon the temperature range desired, and sufficient refrigerant is employed in the bellows so that when the desired temperature has been achieved, all of the refrigerant has been evaporated, so that further increase of pressure is negligible and the bellows will not be ruptured by the increase of temperature.

The second pulley section 22 consists of a substantially cylindrical tubular metal member, including the tubular hub 52 and the radial disk 53 which again is provided with a frusto-conical surface 54 engaging the belt 26. The hub 52 consists of a larger cylindrical portion 55 and a smaller cylindrical portion 56.

The larger cylindrical portion 55 is of sufficient size to fit in the end of the helical compression spring 57, which is seated on this portion 55 against the disk 53. The other end of spring 57 is located about the legs 39 of the frame 37 and engages the threaded annulus 42. Spring 57 tends to urge the pulley sections together and the amount of its pressure is determined by the position of the adjustable annulus 42.

At its right end the pulley section 22 has its hub 52 provided with a diametrically extending bar 58 which may form an integral part of the hub 52, and which is of sufficient size to slide in the slot 36 of the pulley section 21. Thus the bar 58 traverses the bore 29 and is located to be engaged by the plane end of the thermostat stud 51.

The cylindrical surface 56 of hub 52 is provided with a plurality of peripherally extending notches or grooves 59—62, and these grooves are preferably circular in cross section and preferably semicircular.

The frame hub 38 may be secured in place by a set screw 63 located in a threaded bore 64, and this set screw may be used for holding spring finger 65. The spring finger 65 has a hole for the screw bolt 63 which secures that end of the finger fixedly to the frame 37. The spring finger 65 extends longitudinally of the hub 52 and has a downwardly turned rounded end portion 66 for engaging in the grooves 59—62. The spring finger is cammed out of any groove by sufficient axial force exerted in either direction on the pulley section 22, but the spring finger tends to hold the pulley 22 in one of the four different positions corresponding to the four grooves. The operation of the present invention is as follows:

The variable speed pulley 18 is preferably located on the drive shaft 31 of the drive motor 17, which motor is preferably pivotally supported at 67 on a base 68 so that its weight tends to draw the belt 26 taut. The belt 26 engages pulley 18 and also engages an ordinary larger pulley 69 carried by the drive shaft 70 of the centrifugal blower 16. Thus the weight of the motor 17 constantly keeps the belt taut and the movement of the motor on its pivot 67 takes up any slack which might occur due to the changes in size of the pulley 18.

The thermostat is so arranged that when the furnace is cold it is contracted, as shown in Fig. 3, and the driving belt 26 rides down into the groove between the surfaces 25 and 54, as shown in Fig. 3. Thus when the temperature of air delivered from the furnace is low the blower is driven at a low speed. This is desirable because otherwise drafts of cold air would be driven into the rooms.

As the furnace heats up warmer air is carried to the thermostat 19 by the pipe 20, and the expansion of the thermostat 19 causes the plunger 51 to engage the bar 58 and exert an axial force on the pulley section 22 driving it to the left in Fig. 3 closer to the section 21. When this force reaches a certain amount the finger 65 is cammed out of the groove in which it happens to be, and it rides up out of the groove into the next groove as the pulley 22 slides toward the left in Fig. 3. Then the blower is driven at another predetermined speed and the different speeds of drive are accomplished one after another, step by step, as the thermostat expands and as the furnace heats up.

The present device does not change speed gradually by infinitely small increments, but the speed is changed step by step and may be regulated to correspond to a predetermined speed for various predetermined temperatures.

As the furnace cools the diameter of the pulley decreases step by step in the same way, the axial thrust which tends to separate the pulleys being caused by the wedging action of the belt 26 opposing the spring 57 and the contracting thermostat 19.

It will thus be observed that I have invented a variable speed pulley by means of which the blower or other driven device may be driven by any one of a multiplicity of certain speeds. The present device is simple in its operation and positive in its action, and tends to prevent any "hunting" which might take place in the devices of prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new, and desire to secure by Letters Patent of the United States, is:

1. In a variable diameter pulley, the combination of a pulley section provided with a cylindrical hub and adapted to be secured to a shaft with a second pulley section having a cylindrical bore, whereby it is slidably mounted on said hub, said pulley sections being provided with circular belt-engaging flanges having opposed frusto-conical faces for engaging the sides of a tapered belt, thermostatic means carried by one section and reacting against said section and acting against the other section for urging the pulley sections toward each other, the pressure of the belt between said opposed frusto-conical flanges urging the sections apart, and resilient detent means acting between said sections for resisting movement of one section relative to the other until a predetermined force is built up adapted to overcome said resilient means to move the sections into any of a plurality of definite positions for predetermined speeds, said resilient means comprising a spring finger carried by one section and notches formed in the other section and adapted to be engaged by a laterally turned end portion on said spring finger, said notches being curved to provide a camming formation whereby the laterally turned portion of the spring finger may be cammed out of a notch by axial pressure exerted between the sections in either direction.

2. A variable speed pulley comprising a fixed pulley section adapted to be secured to a shaft or the like, said pulley section having a cylindrical hub and a frusto-conical belt-engaging flange, a movable pulley section, said movable pulley section having a substantially cylindrical hub provided with a cylindrical bore for receiving the first-mentioned hub, and said movable pulley section having a radial flange with a frusto-conical surface opposing the first-mentioned frusto-conical surface for engagement with the opposite side of a V belt, said fixed pulley section hub having a threaded cylindrical extension provided with a diametrical slot, and said movable pulley section having a transverse bridge carried by its hub and slidably mounted in said slot, a thermostatic frame having its end wall provided with a threaded bore for reception on said threaded extension, a thermostat in said frame, and having an actuating plunger for engaging said transverse bridge, a spring-engaging abutment carried by said thermostat frame on said fixed pulley section and reacting against said movable pulley section, said movable pulley hub having a plurality of partially circular grooves separated by ribs on its periphery, and a resilient spring finger carried by said thermostat frame and extending longitudinally of said hubs, said finger having an inwardly turned end engaging in said partially circular grooves and being cammed out of said grooves by a predetermined axial force exerted on said thermostat or said spring, the said movable pulley section being moved axially step by step against the action of said spring and said resilient finger by a V belt engaging between said frusto-conical surfaces, and said movable pulley section being moved in the opposite direction by said spring and thermostat step by step upon heating of the thermostat.

WILLIAM W. HALLINAN.

REFERENCES CITED

The following references are of record in the file of this patent:

UNITED STATES PATENTS

| Number | Name | Date |
|---|---|---|
| 15,557 | Bruff | Aug. 19, 1856 |
| 304,171 | Caslin | Aug. 26, 1884 |
| 2,210,976 | Hallinan | Aug. 13, 1940 |

FOREIGN PATENTS

| Number | Country | Date |
|---|---|---|
| 3,328 | Great Britain | Feb. 14, 1908 |
| 26,653 | Great Britain | Nov. 17, 1909 |
| 345,010 | Great Britain | Mar. 19, 1931 |